(12) United States Patent
Fukui et al.

(10) Patent No.: US 6,831,241 B2
(45) Date of Patent: Dec. 14, 2004

(54) TOUCH PANEL SWITCH

(75) Inventors: Toshiharu Fukui, Nara (JP); Takuo Osaki, Hirakata (JP); Hiroshi Moroi, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/363,673

(22) PCT Filed: Jul. 5, 2002

(86) PCT No.: PCT/JP02/06874
§ 371 (c)(1),
(2), (4) Date: Jul. 22, 2003

(87) PCT Pub. No.: WO03/005390
PCT Pub. Date: Jan. 16, 2003

(65) Prior Publication Data
US 2004/0027761 A1 Feb. 12, 2004

(30) Foreign Application Priority Data
Jul. 6, 2001 (JP) ........................... 2001-205848

(51) Int. Cl.⁷ ................................. H01H 1/00
(52) U.S. Cl. ........................................ 200/512
(58) Field of Search ............... 200/5 R, 58 A, 200/85 R, 85 A, 86 R, 512–517, 308–317, 511, 61.43

(56) References Cited

U.S. PATENT DOCUMENTS 4,046,975 A * 9/1977 Seeger, Jr. ................. 200/515

FOREIGN PATENT DOCUMENTS

| JP | 49-60539 | 5/1974 |
| JP | 3-109233 | 11/1991 |
| JP | 4-123728 | 4/1992 |
| JP | 4-143823 | 5/1992 |
| JP | 2714124 | 10/1997 |
| JP | 10-199367 | 7/1998 |
| JP | 10-255591 | 9/1998 |
| WO | 98/22867 | 5/1998 |

* cited by examiner

Primary Examiner—James R. Scott
(74) Attorney, Agent, or Firm—Wenderoth, Lind & Ponack, L.L.P.

(57) ABSTRACT

A touch panel switch having a wide usable operating range and thus a large effective use area and having electrodes disposed opposedly to each other through a spacer installed around the periphery thereof, the spacer formed in an elastic body of $1\times10^5$ to $1\times10^7$ dyne/cm² in elastic modulus comprising an insulation layer and an adhesive layer, the insulation layer further comprising a clearance holding part with a uniform thickness and a gradient part with a thickness gradually decreasing from the clearance holding part into a substrate having the electrodes formed thereon.

11 Claims, 3 Drawing Sheets

TOUCH PANEL SWITCH

TECHNICAL FIELD

The present invention relates to a touch panel switch used as an input operation unit for electronic equipment to feed an input signal by pushing the touch panel switch with a finger, a pen and the like.

BACKGROUND ART

In recent years, many flat touch panel switches have been used as an input operation unit for electronic equipment to perform an inputting operation by applying a small finger pressure, a pen and the like.

Particularly, as portable small information equipment having a variety of functions is prevailing rapidly, the demand for transparent touch panel switches overlaid on a liquid crystal display (referred to as LCD, hereafter) to perform an input operation according to instructions displayed on the LCD, is growing.

A description is given to a prior art touch panel switch as such with reference to the drawings.

In order to facilitate the understanding of structural details of the touch panel switch, the drawings are prepared with the dimensions in thickness directions stretched.

FIG. 6 is a cross-sectional view of a prior art transparent touch panel switch. In FIG. 6, transparent thin film-like first electrode 20 formed of indium oxide (referred to as ITO, hereafter) containing tin is provided on the bottom surface of transparent and flexible insulating sheet 10.

On the upper surface of transparent insulating substrate 30 formed of glass and the like and located underneath aforementioned insulating sheet 10 is disposed second electrode 40, which is formed of ITO and the like, facing aforementioned first electrode 20 with a predetermined spacing provided therebetween.

In order to have first electrode 20 formed on insulating sheet 10 and second electrode 40 formed on insulating substrate 30 facing each other and separated by a predetermined distance from each other, adhesive 50 is applied to the peripheral edges of insulating sheet 10 and insulating layer 60 is applied on the peripheral edges of insulating substrate 30 at the side of second electrode 40. And then both adhesive 50 and insulating layer 60 are fixed together to have a predetermined combined thickness. Thereby, a switch contact is formed between first electrode 20 located towards inside from the place where adhesive 50 and insulating layer 60 are fixed together, and second electrode 40, thus producing a transparent touch panel switch.

Next, a description is made on how a touch panel switch thus structured operates.

A transparent touch panel switch as described above is usually disposed on display devices such as LCD installed on electronic equipment, thereby forming an overlaid structure.

In other words, since the user of electronic equipment is allowed to read operational instructions and pieces of selected information legibly through the touch panel switch, a pushing action applied to the upper surface of insulating sheet 10 of the touch panel switch is carried out with a finger, a pen and the like in accordance with the operational instructions and pieces of selected information, thereby allowing the input operation to have the electronic equipment operated as required.

A description is given to how the touch panel switch operates at that time. Upon being pushed by a finger or a pen, flexible insulating sheet 10 bends downward and first electrode 20 on the bottom surface of insulating sheet 10 is brought into contact with second electrode 40 on insulating substrate 30 to turn on the touch panel switch, thereby allowing a signal to be fed to a circuit of the electronic equipment connected to first electrode 20 and second electrode 40.

Electronic equipment adopting such a touch panel switch as above is generally provided with a display screen that is large enough to cope with the applications thereof and also with a touch panel switch comparable to the display screen in size, through which an input operation is allowed to be performed. A control circuit of the electronic equipment has a plurality of operational instructions and pieces of selected information displayed on the display screen simultaneously, and signals corresponding to positions, where respective operational instructions and pieces of selected information are displayed, are outputted from a touch panel switch, thereby allowing the electronic equipment to behave as the operator thereof desires.

However, in the prior art touch panel switch as described above, when an input operation is performed by pushing insulating sheet 10, the pushing down step involves a downward displacement distance equaling the combined thickness of adhesive 50 and insulating layer 60, thereby applying a great deal of stress to insulating sheet 10 and first electrode 20 formed of ITO and disposed on the bottom surface thereof. Particularly, the stress is remarkable when the peripheral area of the touch panel switch, i.e., the vicinity of the area, where adhesive 50 and insulating layer 60 are fixed together, is pushed as a partially enlarged cross-sectional view of FIG. 7 shows.

When an input operation is repeated in the vicinity of the areas, where adhesive 50 and insulating layer 60 are fixed together, the function of thin film like first electrode 20 as an electrode tends to be deteriorated at the pushed position and in the vicinity thereof due to the stress, thereby hindering sometimes the generation of a predetermined input signal.

With the aforementioned prior art touch panel switch, in order to have plane electrodes facing each other with a predetermined spacing formed therebetween, an insulating sheet and an insulating substrate, each provided with the electrodes, are fixed by adhesion onto a predetermined position, respectively, with an insulating layer placed therebetween, thereby allowing the areas except for the area, where the insulating sheet and insulating substrate are fixed together, to function as a switch. When the pushing action is repeated in the vicinity of the area of fixing together, the peripheral areas of a touch panel switch near the area of fixing together are not allowed to be used as input operation areas to act as switch contacts from the point of reliability due to the functional vulnerability of the plane electrodes. As a result, a problem of shrinkage in the effectively usable area for an input operation is presented.

Although a description is made in the Japanese Patent Laid-Open Application No.H04-143823 to the effect that an adoption of an elastic body disposed on the input operation area as a gap maintaining material improves the reliability against a repetitive application of a pressing force to one and the same place, a double-faced adhesive framework material is used on the peripheral areas and no disclosure is made on countermeasures to prevent the vicinity of the peripheral areas from becoming deteriorated. Also, a description on an example of using an elastic body as a spacer for the peripheral areas is carried in the Japanese Patent Laid-Open Application No. H04-123728. However, the spacer is intended for solving the problem of sagging of a film due to heat and moisture by fixing an elastic body applied with an adhesive on both surfaces thereof in place. Therefore, the spacer can be anything as far as it is formed of an elastic body and what are described in the exemplary embodiment are such foam materials as urethane and rubber. Any solutions of the aforementioned problem of an input operation area shrinking in the peripheral areas are not disclosed.

DISCLOSURE OF INVENTION

The present invention deals with the foregoing problem and aims at providing a touch panel switch, in which an effectively usable area is allowed to be expanded.

In order to achieve the aforementioned objective, a touch panel switch of the present invention comprises:

a flexible insulating sheet having a first electrode; and an insulating substrate having a second electrode, in which both electrodes are facing each other with a spacer provided therebetween on peripheral areas of the touch panel switch, and the spacer is an elastic body with a coefficient of elasticity ranging from $1 \times 10^5$ dyne/cm$^2$ to $1 \times 10^7$ dyne/cm$^2$.

Since an insulating layer has an appropriate magnitude of elasticity, even when a pressing force is applied to the flexible insulating sheet in the vicinity of the area where the flexible insulating sheet and insulating substrate are fixed together, the insulating layer is deformed in the direction to reduce the thickness thereof in accordance with the bending of the flexible insulating sheet, thereby reducing a deforming stress imposed to the flexible insulating sheet and the first electrode disposed on the bottom surface thereof. As a result, the functional deterioration of the first electrode is suppressed and the area usable as a switch contact is expanded.

BEST MODE FOR CARRYING OUT THE INVENTION

Figure 1:
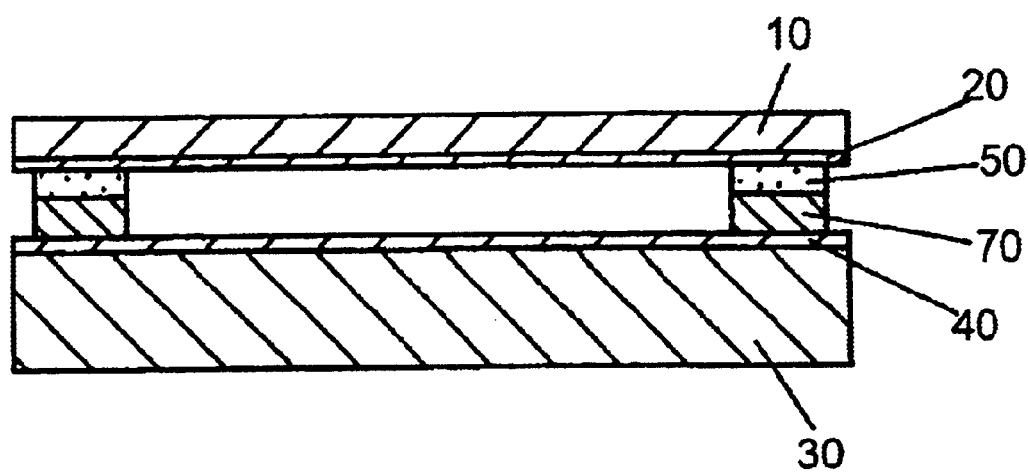
FIG. 1 is a cross-sectional view of a touch panel switch in exemplary embodiment 1 of the present invention.

A touch panel switch of the present invention comprises a flexible insulating sheet having a first electrode and an insulating substrate having a second electrode, in which both electrodes are facing each other with a spacer interposed therebetween and provided on the peripheral areas of the touch panel switch, and the spacer is an elastic body with a coefficient of elasticity ranging from $1 \times 10^5$ dyne/cm$^2$ to $1 \times 10^7$ dyne/cm$^2$. Since the spacer is elastic, even when a pressing force is applied to the flexible insulating sheet in the vicinity of the area where the flexible insulating sheet and insulating substrate are fixed together, the spacer is deformed in the direction to reduce the thickness thereof in accordance with the bending of the flexible insulating sheet, thereby reducing a deforming stress imposed to the flexible insulating sheet and the first electrode disposed on the bottom surface thereof. As a result, the functional deterioration of the first electrode is suppressed and the area usable as a switch contact is expanded.

And, when a pressing force is applied to the flexible insulating sheet in the vicinity of the area where the flexible insulating sheet and insulating substrate are fixed together, the spacer is deformed in the direction to reduce the thickness thereof. As a result, the magnitude of a required pressing force to be applied is reduced, thereby a touch panel switch, which enables the input operation to be carried out with a smaller pressing force and excels in operability, is realized.

When a pressing force is applied to the flexible insulating sheet in the vicinity of the area of fixing together and a coefficient of elasticity of the spacer is less than $1 \times 10^5$ dyne/cm$^2$, having almost a gel-like property, the resulting adhesion force is weak due to an excessively low coefficient of elasticity, and such a defect as causing the flexible insulating sheet and insulating substrate to be readily peeled off from each other is brought about.

When a coefficient of elasticity of the spacer exceeds $1 \times 10^7$ dyne/cm$^2$ and a pressing force is applied to the flexible insulating sheet in the vicinity of the area of fixing together, an appropriate deformation is not allowed to be obtained due to an excessively high coefficient of elasticity. As a result, the effect of reducing the deformation stress imposed to the flexible insulating sheet and first electrode disposed on the bottom surface thereof is small, thereby making it difficult for the functional deterioration of the first electrode due to the repeated application of a pressing force to the flexible insulating sheet to be prevented from occurring.

Accordingly, as far as the coefficient of elasticity of the spacer remains within the range of $1 \times 10^5$ dyne/cm$^2$ to $1 \times 10^7$ dyne/cm$^2$, an appropriate adhesion force is obtained and also the functional deterioration of the first electrode due to the repeated application of a pressing force to the flexible insulating sheet is prevented from occurring.

In addition, with a touch panel switch of the present invention, the ratio of the maximum value in coefficient of elasticity to the minimum value is restricted to less than 10. By having the ratio of the spacer's coefficient of elasticity made less than 10 at different ambient temperatures within the ambient temperature range of $-10°$ C. to $60°$ C. which is considered as the general operating temperature range for electronic equipment, the difference of a pressing force applied to the flexible insulating sheet is suppressed to be small between the high and low temperatures in ambient temperature.

Also, with the foregoing touch panel switch of the present invention, the thickness of insulating layer's edge part is gradually reduced towards the direction of the input operation area. When a pressing force is applied to the flexible insulating sheet in the vicinity of the area of fixing together, a slant of the insulating layer's edge part together with the insulation layer's reduction in thickness in accordance with the bending of the flexible insulating sheet brings about such an action as causing the flexible insulating sheet to warp along the slanting section of the insulating layer and allowing the deformation stress imposed to the flexible insulating sheet and the first electrode disposed on the bottom surface thereof to be reduced further.

Furthermore, with the touch panel switch of the present invention, adhesion is provided to the insulating layer itself, thereby eliminating an additional adhesive. As a result, the flexible insulating sheet and insulating substrate are allowed to be fixed together by means of the insulating layer only, thereby the step of applying an adhesive is eliminated and touch panel switches become available at a low cost.

The touch panel switch of the present invention is also a touch panel switch, in which the flexible insulating sheet, first electrode, insulating substrate and second electrode are made transparent. Because of the transparency thus realized, the touch panel switch can be disposed on the upper surface of a display device to allow the operator to carry out the input operation based on the displayed content while reading legibly the display under transmittance through the touch panel switch, thereby a transparent touch panel switch with excellent convenience becomes available.

Another touch panel switch of the present invention comprises a flexible insulating sheet having a first electrode and a second electrode facing the first electrode, in which an adhesive is applied to the flexible insulating sheet or a bottom insulating sheet, which is supported by a rigid substrate from underneath, at predetermined places thereof so as to have both electrodes provided with a predetermined spacing therebetween and an insulating layer having elasticity is stacked by adhesion on top of the adhesive. Since the insulating layer is elastic, even when a pressing force is applied to the flexible insulating sheet in the vicinity of the area of fixing together, the insulating layer is deformed along the direction to reduce the thickness thereof in accordance with the bending of the flexible insulating sheet, thereby functional deterioration of the first electrode is prevented from occurring, usable area as a switch contact is expanded and effective operational area is increased.

And, when a pressing force is applied to the flexible-insulating sheet in the vicinity of the area of fixing together, the insulating layer is deformed in the direction to reduce the thickness thereof. As a result, the magnitude of the required pressing force can be reduced, thereby a touch panel switch with excellent operability is realized, and the input operation with a light pressing force is realized.

Furthermore, a thin film like second electrode is allowed to be formed on the flexible insulating sheet similarly as the first electrode is formed and, therefore, the flexible insulating sheet and bottom insulating sheet are prepared by the use of a common material, thereby a touch panel switch becomes available at a low cost.

Next, a specific description is given to a touch panel switch in some of the exemplary embodiments of the present invention with reference to drawings.

In order to make the respective structural drawings easy to understand, the dimensions in the thickness directions are expressed by enlargement.

(Exemplary Embodiment 1)

EXAMPLE

FIG. 1 is a cross-sectional view of a touch panel switch in exemplary embodiment 1 of the present invention. In FIG. 1, insulating sheet 10 is flexible, transparent, and is composed of such resins as polyethylene terephthalate, polyethersulfone, polyethylene naphthalate, polycarbonate, norbornene based resins and the like according to a drawing method or a casting method. Plane first electrode 20 composed of an optically transparent ITO thin film is deposited on the bottom surface of flexible insulating sheet 10 as mentioned above according to a sputtering method and the like.

On the other hand, insulating substrate 30 is a rigid substrate composed of such transparent materials as glass, polycarbonate, acrylic and the like and on the upper surface of insulating substrate 30 also is deposited plane second electrode 40 composed of an optically transparent ITO thin film according to a sputtering method and the like in the same way as in preparing first electrode 20.

Adhesive 50 with a predetermined width and a predetermined thickness is disposed on the peripheral edges of the bottom surface of first electrode 20 according to a screen printing method. Adhesive 50 is a material mainly composed of acrylic, polyester, silicone and the like. Although not shown in FIG. 1, adhesive 50 is disposed on all peripheral edges of the bottom surface of plane flexible insulating sheet 10.

Insulating layer 70 with a predetermined width and a predetermined thickness is disposed on the peripheral edges of the upper surface of second electrode 40 by applying a paste-like insulating material according to a screen printing method with a heat curing process applied thereafter in the same configuration as adhesive 50 at the position opposing thereto. In place of the screen printing method, other methods like allowing such patterning as gravure printing, die coating and the like to be performed and also like spray coating via a mask are suitable. As the material for insulating layer 70 can be used such rubber-like elastic resins as silicone, urethane, butadiene, vinyl resins and the like, or an epoxy resin and the like modified by the foregoing resins.

Then, by having insulating sheet 10 and insulating substrate 30 fixed together with adhesive 50 and insulating layer 70 as described above arranged to be stacked with each other, a touch panel switch of the present invention is completed.

In exemplary embodiment 1, insulating layer 70 is 30 $\mu$m thick and adhesive 50 is 15 $\mu$m thick. Elasticity of the stacked body of 30 $\mu$m of insulating layer 70 and 15 $\mu$m of adhesive 50 measures $1 \times 10^6$ dyne/cm$^2$.

Next, a description is given how the touch panel switch thus structured operates.

Figure 2:
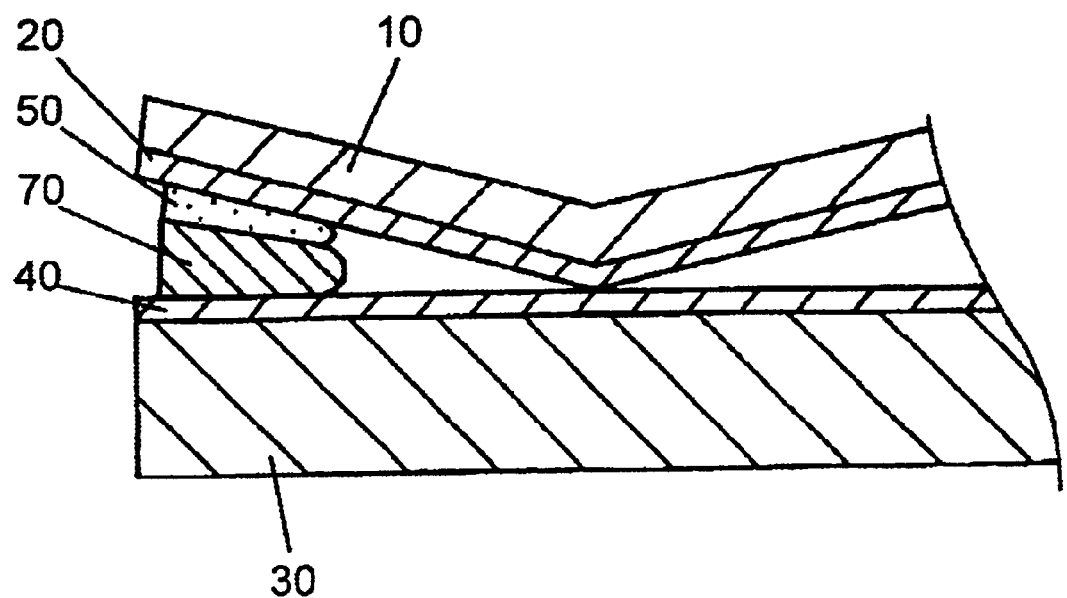
FIG. 2 is a partially enlarged cross-sectional view of the touch panel switch.

FIG. 2 is a partially enlarged cross-sectional view of the touch panel switch structured as FIG. 1 shows, illustrating in detail how the upper surface of insulating sheet 10 is applied with a pressing force in the vicinity of the place where insulating sheet 10 and insulating substrate 30 are fixed together.

As shown in FIG. 2, when a pressing force is applied to the vicinity of the place of fixing together, insulating layer 70 with rubber-like elasticity is deformed in such a way as reducing the thickness thereof at the side of depressed insulating sheet 10 and also shows a less degree of elastic deformation than elastic adhesive 50 shows.

More specifically, when insulating sheet 10 is pushed, the spacer, i.e., the stacked body of insulating layer 70 and adhesive 50 undergoes an elastic deformation in accordance with the bending of insulating sheet 10, thereby reducing the thickness of the stacked body at the pushed side. Therefore, the extent of bending of insulating sheet 10 and first electrode 20 on the bottom surface of insulating sheet 10 becomes smaller in comparison with the case of a prior touch panel switch.

A key press test is conducted with a prepared touch panel switch by applying a pressing force of 2.45 N to a position apart by 1.0 mm from the edge of insulating layer 70 of the prepared touch panel switch and it is confirmed that the initial performance is maintained without any deterioration after one million key pressings.

Also, a sliding test is conducted with a prepared touch panel switch by using a polyacetal pen of R0.8 and applying a pressing force of 2.45 N to a position of 1.0 mm from the edge of insulating layer 70 of the prepared touch panel switch and it is confirmed that the initial performance is maintained without any deterioration after 50,000 times of a reciprocating motion.

Thereby, it is proven that, even if operation of applying a pressing force to the vicinity of the place where insulating sheet 10 and insulating substrate 30 are fixed together on a touch panel switch, is repeated, a deformation stress imposed to first electrode 20 is reduced, thereby allowing the functional deterioration of first electrode 20 to be prevented from occurring.

Thus, according to the present exemplary embodiment, the elasticity of insulating layer 70 can prevent the functional deterioration of first electrode 20 caused by repeated operation of applying a pressing force to the vicinity of the place where insulating sheet 10 and insulating substrate 30 are fixed together, thereby allowing the operation of applying a pressing force to be performed near the place of fixing together. As a result, the area usable as a switch contact is allowed to be expanded to the fringe areas of the touch switch panel, thereby enabling the realization of a touch panel switch with an enlarged effectively usable area. Particularly, when a display device with a large ratio of the peripheral area to the entire surface area is put in place as often experienced with handy or small electronic equipment, the display area of the display device is allowed to be utilized to the fullest extent without waste, thereby making a touch panel switch with a high degree of usability available to the market.

Furthermore, by suppressing the ratio of the maximum value to the minimum value in coefficient of elasticity of insulating layer 70 to 10 or less at different ambient temperatures in the general operating temperature range for electronic equipment from $-10°$ C. to $60°$ C., the differential in pressing force at the time of applying a pressing force to a flexible insulating sheet between a low temperature and a high temperature in ambient temperature can be suppressed to a small value.

Figure 3:
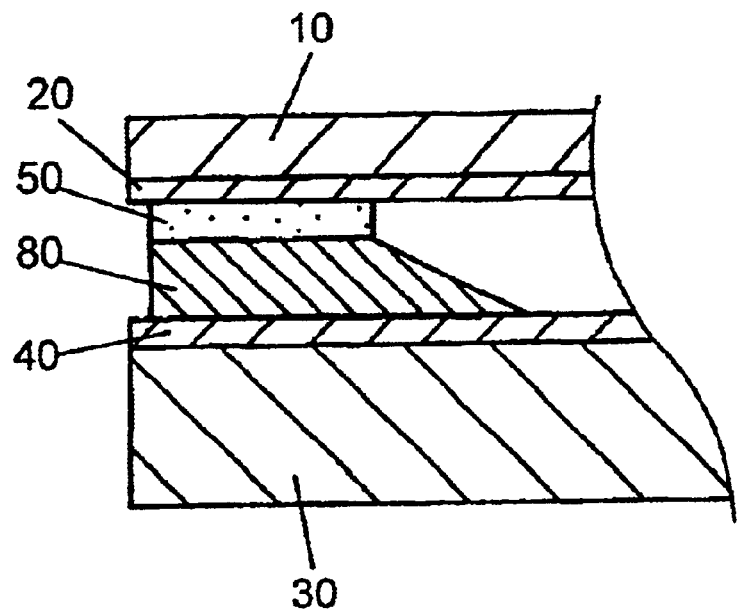
FIG. 3 is another partially enlarged cross-sectional view of the touch panel switch.

In addition, as the partially enlarged view of FIG. 3 shows, insulating layer 80 is formed by printing so as to have the edge part thereof reduced gradually in thickness. When a pressing force is applied to insulating sheet 10 in the vicinity of the place of fixing together, not only insulating layer 80 is deformed in the direction of reducing the thickness thereof in accordance with the bending of insulating sheet 10 but also insulating sheet 10 is warped along the slanting portion of insulating layer 80 at the time of applying a pressing force because of the structure of making the edge part of insulating layer 80 slant, thereby allowing the deforming stress imposed to insulating sheet 10 and first electrode 20 on the bottom surface thereof to be reduced and enabling the enhancement of durability of first electrode 20 against the repeated operation of applying a pressing force to the vicinity of the place of fixing together.

Figure 4:
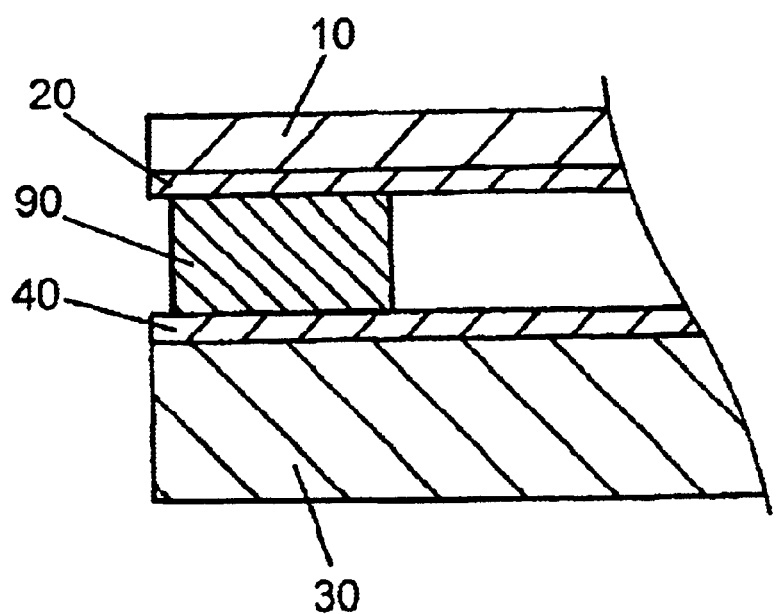
FIG. 4 is still another partially enlarged cross-sectional view of the touch panel switch.

And, what the partially enlarged view of FIG. 4 indicates is that insulating layer 90 possesses adhesion properties and insulating layer 90 as such adheres insulating sheet 10 and insulating substrate 30 together, thereby allowing the step of applying an adhesive to be omitted and enabling the contribution to realization a low cost touch panel switch.

When the coefficient of elasticity of the spacer is $1\times10^5$ dyne/cm$^2$ or less, insulating layer 70 is reduced to a gel-like state with weak adhesion, thereby presenting a defect of allowing insulating sheet 10 and insulating substrate 30 to be readily peeled off from each other.

When the coefficient of elasticity of the spacer is excessively high, exceeding $1\times10^7$ dyne/cm$^2$, a suitable extent of deformation is not achievable at the time when a pressing force is applied to insulating sheet 10 in the vicinity of the place of fixing together. Therefore, the effect of reducing the deformation stress imposes to flexible insulating sheet 10 and first electrode 20 on the bottom surface thereof is minimal, thereby making it difficult for first electrode 20 to prevent suffering from the functional deterioration caused by a repeated application of a pressing force to insulating sheet 10.

(Comparative Example)

By employing a thermosetting epoxy as insulating layer 70, a touch panel switch having the same structure as the one in the aforementioned exemplary exemplary embodiment is prepared. In comparison with the stack body in exemplary embodiment 1, a stack body composed of an insulating layer and an adhesive layer here measure $1\times10^8$ dyne/cm$^2$ in coefficient of elasticity. When a key press test is conducted by applying a pressing force of 2.45 N to a position apart by 2.5 mm from the edge of the insulating layer of the touch panel switch, a deterioration in the switch function is recognized after 100,000 operations.

Also, a sliding test is conducted with the prepared touch panel switch by using a polyacetal pen of R0.8 and applying a pressing force of 2.45 N to a position apart from the edge of the insulating layer by 2.5 mm and it is observed that the switch function tends to deteriorate after 10,000 times of a reciprocating motion.

It is known from the comparison between "Example" and "Comparative Example" that, when the coefficient of elasticity of the spacer remains in the range of $1\times10^5$ dyne/cm$^2$ to $1\times10^7$ dyne/cm$^2$, not only an appropriate strength of adhesion is obtained but also a deformation stress imposed to first electrode 20 is reduced, thereby allowing the deterioration of first electrode 20 in switch function due to a repetition of applying a pressing force to insulating sheet 10 to be prevented from occurring.

In addition, a touch panel switch of the present invention maintains enough durability against a key press test and a sliding test as performed at a place apart from the edge of an insulating layer by about 1.0 mm and the area extending towards inside therefrom is allowed to be used effectively as the switch operation area, thereby providing marked effectiveness to a small-size touch panel switch as employed in a portable information terminal and a portable telephone, in which the ratio of the peripheral area to the entire operation area is large.

Although insulating layer 70 is formed on the side of insulating substrate 30 and adhesive 50 is provided on the side of insulating sheet 10 in exemplary embodiment 1, insulating layer 70 is also allowed to be formed on insulating sheet 10.

(Exemplary Embodiment 2)

A description is given to other touch panel switches in exemplary embodiment 2 of the present invention.

The same reference numeral as used in exemplary embodiment 1 is assigned to a part with the same structure as the one in exemplary embodiment 1.

Figure 5:
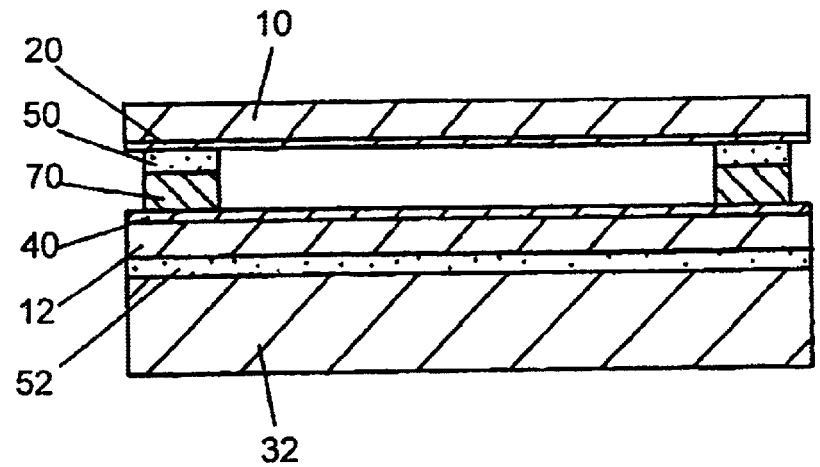
FIG. 5 is a cross-sectional view of a touch panel switch in exemplary embodiment 2 of the present invention.
Figure 6:
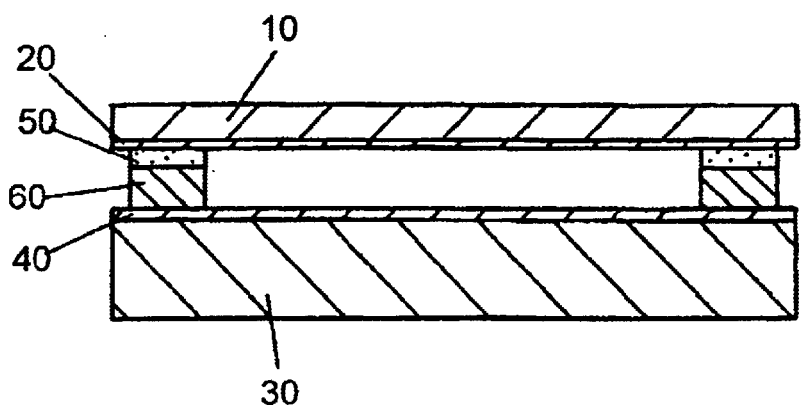
FIG. 6 is a cross-sectional view of a prior art touch panel switch.
Figure 7:
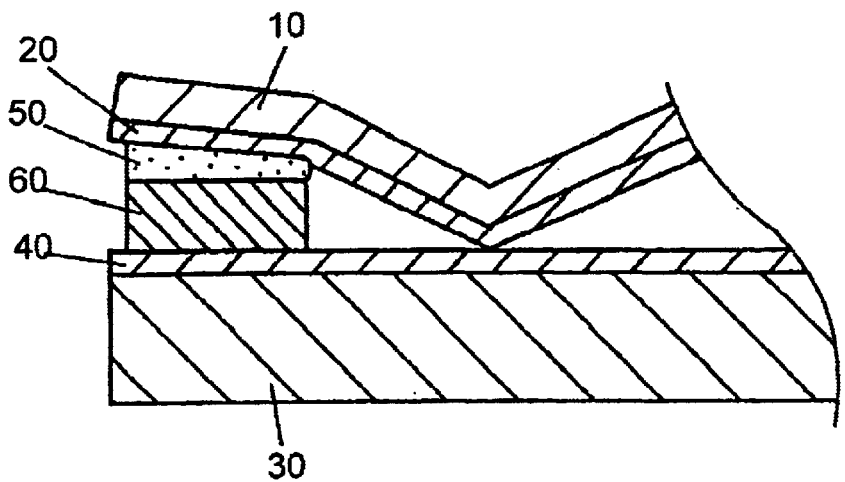
FIG. 7 is a partially enlarged cross-sectional view of the prior art touch panel switch.

FIG. 5 is a cross-sectional view of a touch panel switch in exemplary embodiment 2 of the present invention. In FIG. 5, different flexible sheet 12 is composed of such resins as polyethylene terephthalate, polyethersulfone, polyethylene naphthalate, polycarbonate, norbornene based resins and the like and formed to a transparent sheet-like configuration according to a drawing method or a casting method like insulating sheet 10 as described in exemplary embodiment 1.

Second electrode 40 composed of ITO is formed on aforementioned insulating sheet 12.

In addition, substrate 32 is a rigid body composed of such transparent materials as glass, polycarbonate, acrylic resin and the like and aforementioned insulating sheet 12 is attached by adhesion on the upper surface of insulating substrate 32 by means of adhesive 52 as applied onto the upper surface of substrate 32.

Other parts including insulating layer 70 with rubber-like elasticity are the same as the ones used in exemplary embodiment 1 and a touch panel switch is constructed by the use of these parts.

How the touch panel switch of exemplary embodiment 2 operates is the same as described in exemplary embodiment 1 and the description thereof is omitted here.

According to exemplary embodiment 2, in addition to enabling the realization of a touch panel switch having a large effectively usable area like the one in exemplary embodiment 1, aforementioned different insulating sheet 12 with second electrode 40 disposed on the upper surface thereof is allowed to be prepared by the same one as insulating sheet 10 provided with first electrode 20. Therefore, despite the fact that an additional step of attaching substrate 32 by fixing is required, the costly process of electrode forming is allowed to be carried out by using the same material, thereby making a less expensive touch panel switch available to the market.

The same advantages as described in exemplary embodiment 1 are possible with exemplary embodiment 2 with such measures taken as the range of coefficient of elasticity of insulating layer 70 is limited from $1 \times 10^5$ dyne/cm$^2$ to $1 \times 10^7$ dyne/cm$^2$, the ratio of the minimum coefficient of elasticity to the maximum is limited to less than 10 with insulating layer 70 at different ambient temperatures within the ambient temperature range of –10° C., to 60 ° C., insulating layer 80 with the thickness thereof reduced gradually towards the edge is employed and insulating layer 90 provided with adhesion is adopted.

Industrial Applicability

As described in above, the present invention can provide a touch panel switch used in an input operation unit for electronic equipment, which allows an input signal to be supplied by pushing operations with a finger or a pen. The touch panel switch features a large usable switch area, thereby allowing the use of a touch panel switch having a large effectively usable area. Particularly, the touch panel switch of the present invention is useful as a downsized touch panel switch for portable information terminals and mobile phones, in which the ratio of the peripheral area to the entire switch operation area is large.

What is claimed is:

1. A touch panel switch comprising:
   a flexible insulating sheet having a first electrode; and
   an insulating substrate having a second electrode,
   wherein said first and second electrodes are disposed facing each other with a spacer provided therebetween on peripheral areas of said touch panel switch, and
   said spacer is an elastic body with a coefficient of elasticity ranging from $1 \times 10^5$ dyne/cm$^2$ to $1 \times 10^7$ dyne/cm$^2$.

2. A touch panel switch according to claim 1, wherein said spacer is an elastic body with a ratio of a minimum coefficient of elasticity to a maximum coefficient of elasticity limited to 10 or less over a temperature range of –10° C. to 60° C.

3. A touch panel switch according to claim 1, wherein said insulating substrate includes a further insulating sheet having said second electrode and fixed on a supporting substrate via an adhesive.

4. A touch panel switch according to claim 3, wherein said spacer has an insulating layer to provide a predetermined spacing and an adhesive layer to adhere said insulating layer to at least one selected from said insulating substrate and said flexible insulating sheet.

5. A touch panel switch according to claim 4, wherein said insulating layer has a space holding portion and a slanting portion, said space holding portion having a predetermined uniform thickness and said slanting portion having a gradually decreasing thickness starting from said space holding portion towards inside of said insulating substrate.

6. A touch panel switch according to claim 1, wherein all of said first electrode, second electrode, flexible insulating sheet and insulating substrate are light transmittable.

7. A touch panel switch according to claim 3, wherein all of said first electrode, second electrode, flexible insulating sheet, insulating substrate, adhesive and supporting substrate are light transmittable.

8. A touch panel switch according to claim 3, wherein a switch operation area occupies an area formed inside by 1 mm or more from edges of said spacer.

9. A touch panel switch according to claim 4, wherein said insulating layer and adhesive layer are both formed by printing.

10. A touch panel switch according to claim 1, wherein said spacer has an insulating layer to provide a predetermined spacing and an adhesive layer to adhere said insulating layer to at least one selected from said insulating substrate and said flexible insulating sheet.

11. A touch panel switch according to claim 1, wherein a switch operation area occupies an area formed inside by 1 mm or more from edges of said spacer.

* * * * *

UNITED STATES PATENT AND TRADEMARK OFFICE
CERTIFICATE OF CORRECTION

PATENT NO. : 6,831,241 B2
DATED : December 14, 2004
INVENTOR(S) : Toshiharu Fukui et al.

It is certified that error appears in the above-identified patent and that said Letters Patent is hereby corrected as shown below:

Title page,
Item [56], References Cited, FOREIGN PATENT DOCUMENTS, please insert the following reference:
-- JP    02-273409    11/1990 --.

Column 10,
Line 11, please replace "$1\times10^7$ dyne/cm$^{2\cdot}$" with -- $1\times10^7$ dyne/cm$^2$. --.

Signed and Sealed this

Fourth Day of October, 2005

JON W. DUDAS
*Director of the United States Patent and Trademark Office*